May 25, 1948. R. A. VAN HASBROECK 2,442,278
APPARATUS FOR IRRIGATING CAVITIES AND PASSAGES OF THE BODY
Filed May 25, 1945
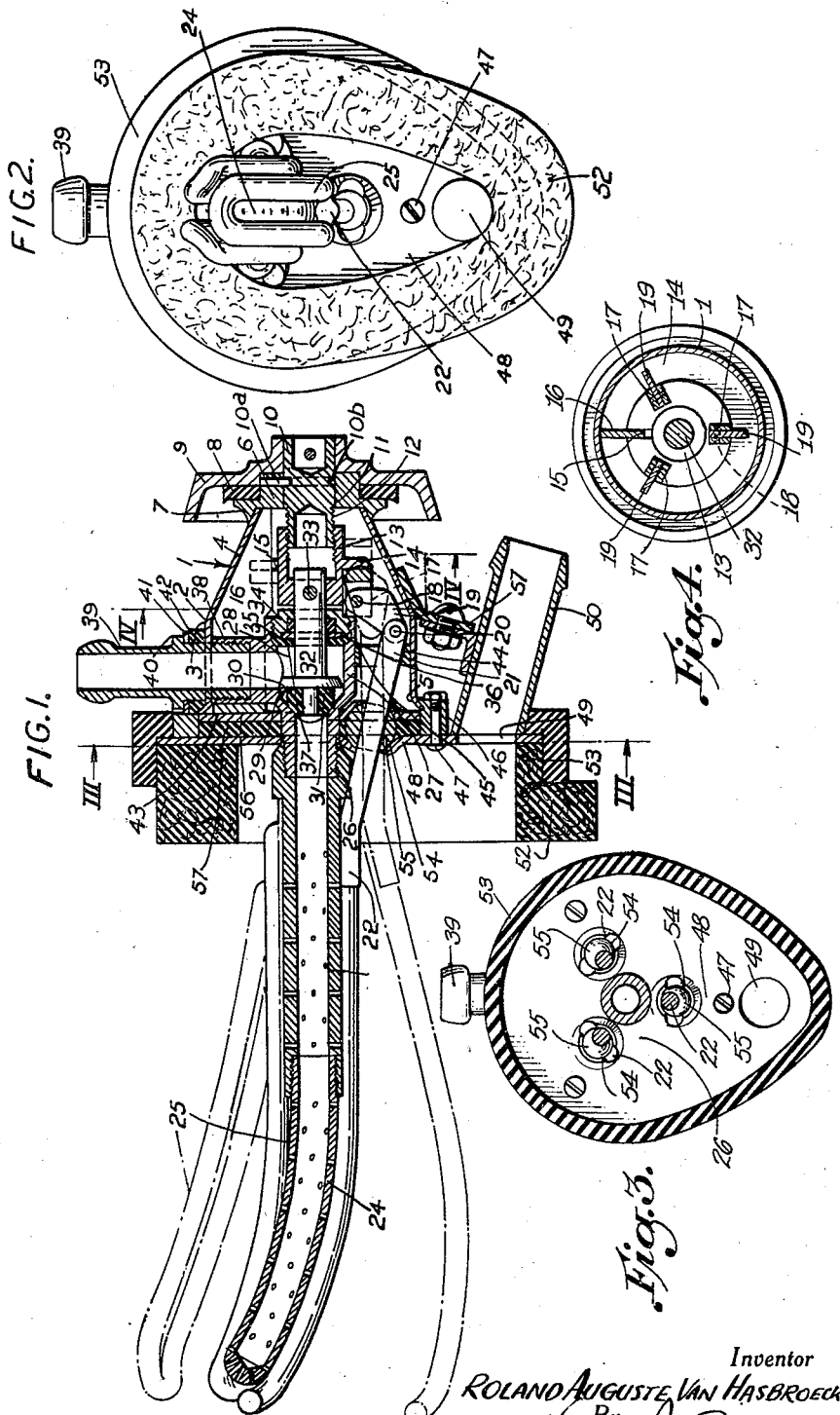
Inventor
ROLAND AUGUSTE VAN HASBROECK
By
Attorney Patented May 25, 1948

2,442,278

UNITED STATES PATENT OFFICE 2,442,278

APPARATUS FOR IRRIGATING CAVITIES AND PASSAGES OF THE BODY

Roland Auguste Van Hasbroeck, London, England

Application May 25, 1945, Serial No. 595,679
In Great Britain May 25, 1944

7 Claims. (Cl. 128—244)

This invention concerns improvements in or relating to apparatus for irrigating cavities and passages of the body, and especially the human body, although the device may be used for irrigating the cavities or passages of the bodies of animals. More particularly the invention is concerned with irrigating devices of the kind comprising a body provided with a spray tube for insertion into the cavity (e. g. the vagina) and having a plurality of expansible dilating fingers arranged around the spray tube in such a way that they may be simultaneously adjusted by control mechanism on said body to enlarge the cavity without covering such walls to an extent which will interfere with such walls being properly flushed and cleansed, the irrigator being provided with an inlet whereby liquid may be fed to the said spray tube and with an outlet through which the irrigating liquid and educted matter may leave the cavity.

Devices of the above named kind have been proposed previously in which the arrangement was such that the irrigating liquid and the educted matter passed through the dilating finger operating mechanism as it was being discharged, so that the mechanism was wetted and very liable to be soiled. Furthermore, the devices were not constructed in such a way as to give ready access to their interiors to facilitate the cleaning of the soiled mechanisms, and therefore the devices were not hygienic and were also liable to become corroded and faulty in action.

It is an object of the invention to provide an irrigating device in which the internal dilating finger operating mechanism is insulated from all fluid passing through the device, i. e., both the irrigating fluid as it is fed into the device and the fluid discharged from the device.

Another object of the invention is to provide a generally improved irrigating device which is compact and convenient for use.

According to the invention a device of the kind referred to for irrigating cavities and passages in the body is provided wherein the control mechanism for the dilating fingers is insulated from the irrigating and educted fluid during the discharge thereof.

According to a further feature of the invention the said control mechanism is insulated from all fluid passing to and from the spray tube of the device.

According to a still further feature of the invention the irrigating device is provided with a valve controlling the flow of irrigating fluid to the spray tube, and this valve is controlled by one and the same controlling member as the dilating fingers so that both these parts of the device are subordinated to a common command.

In accordance with a further feature of the invention the said dilating fingers are pivoted in the plane of a diaphragm or partition which is disposed adjacent the inner end of the spray tube and which segregates, in a liquid-tight manner, the dilating finger operating mechanism within the body of the apparatus from the exterior spray tube end of such body.

According to a further feature of the invention the said diaphragm is a rigid one and the pivots of the dilating fingers are mounted in a fluid-tight manner in said diaphragm.

Preferably the pivots of said dilating fingers are ball pivots. Appropriate packing means may be provided to ensure that the said pivots are liquid-tight.

According to a further feature of the invention the irrigating liquid outlet of the apparatus is disposed wholly outside that part of the said body housing the dilating finger controlling mechanism.

In accordance with a still further feature of the invention the irrigating inlet channel of the apparatus passes through the said body but has no communication with the interior thereof.

Further features of the invention will become apparent from the appended description and claims.

In order that the invention shall be more readily carried into practice, certain embodiments of the same will now be described by way of example with reference to the accompanying drawings in which:

Figure 1 is a longitudinal vertical sectional elevation of one form of vaginal douche constructed in accordance with this invention;

Figure 2 is an end elevation of the same douche viewing it from the spray tube end thereof;

Figure 3 is a cross-sectional view of the douche, the section being taken on line III—III Figure 1;

Figure 4 is another cross-sectional view of the douche, the section being taken on line IV—IV Figure 1.

Referring to Figures 1 to 4 of the accompanying drawings it will be seen that the vaginal douche there depicted comprises a body generally indicated by the reference 1. This body comprises a tubular shell or casing 2 having a cylindrical part 3 contiguous with a frusto-conical part 4. At its inner end this casing has a peripheral outwardly extending frusto-conical flange 5, and at its outer end it has a circular end plate 6 secured thereto. This end plate has a peripheral flange 7 against which bears a rubber or other sealing washer 8 clamped between the flange and the inner face of a peripherally flanged control wheel 9 secured upon the outer end of a spindle 10 rotatably journalled in a central hole 11 in the end plate 6 and restrained against endwise movement in the plate 6 by a grub screw 10a engaging in a peripheral groove 10b in the spindle 10.

The spindle 10 is co-axial with the casing 2 and is externally screw threaded at its inner end portion 12, and upon this portion of the spindle is mounted an internally screw threaded nut or spider 13 provided with a peripheral flange 14 radially slotted at 15 to receive a guide web 16 radially fixed within the casing 2, and which prevents the nut or spider from rotating relatively to the casing 2.

The flange 14 of the nut or spider 13 is provided with three pairs of inwardly extending spaced parallel lugs 17, these pairs of lugs being spaced around the axis of the nut or spider at 120° apart. Between each pair of lugs 17 is pivoted at 18 one end of a link 19 pivoted at its other end at 20 to the outer end of the shank 21 of a dilating finger 22.

There are three dilating fingers 22 equally spaced around a perforated spray tube 23 which has, at its inner end, a detachable longitudinally curved perforated tubular nozzle 24, and each dilating finger has a looped part 25 longitudinally curved so as to lie along the spray tube and its nozzle when the dilating fingers are in their retracted or inoperative positions.

At its outer end (i. e., the end nearest the body 1) the spray tube is screwed on to a tubular spigot 26 provided at the inner end of a hollow cylindrical valve housing 27 mounted within the casing 2 co-axially therewith. The housing 27 has therewithin a cylindrical chamber 28 having an annular conical valve seat 29 at its inner end upon which is adapted to seat a valve 30 having a resilient (e. g., rubber) annular seating element 31.

The valve 30 has a shank 32 co-axial with the valve housing 27 and with the operating spindle 10, and this shank is, at its outer end, secured by a cross pin 33 to the nut or spider 13 into which the shank axially projects.

Around the shank 32 of the valve is arranged a packing gland which comprises a gland nut 34 which screws into the end of the valve housing 27 remote from the spray tube 23, this packing gland being provided with rubber or other suitable packing washers 35 and 36 which are respectively trapped between the housing and the gland nut and an intermediate metal washer 37. The interior of the valve housing is, therefore, completely sealed off and insulated from the interior of the casing 2.

From the upper side of the valve housing 27 extends an upright tubular boss 38 internally screw threaded to receive the screw threaded end of a spigot 39 projecting vertically through a hole in the cylindrical part 3 of the casing 2 of the device. The spigot 39 is provided with a flange 40, and the casing 2 is trapped between the upper end of the boss 38 and the said flange 40 with intermediate packing washers 41 and 42, the lower one of which is resilient, and is formed, for instance, of rubber. The spigot 39 serves to fix the valve housing 27 in position within the casing.

The guide web 16 hereinbefore referred to is provided with an eye 43 which engages around the boss 38 of the valve housing, and so holds the web in the required position within the casing 2. An annular guide plate 44 also assists in supporting the housing 27 within the casing 2, this annular plate extending around the body of the housing 27 and being radially slotted at its upper part to accommodate the boss 38. The plate 44 also has for each dilating finger a radial slot 45 through which the shank of the dilating finger passes.

A ring 46 is mounted on the outwardly flared end 5 of the casing 2 and is soldered or otherwise secured thereto. This ring has a plate 48 secured to its inner end (i. e., the end remote from the control wheel 9) by bolts 47; this plate is of inverted pear shape and in its lower end is a hole 49 leading into a downwardly inclined discharge or outlet pipe 50 also connected to the casing 2 by a bracket 51.

On inner free side of the plate 49 is fixed a sponge rubber or equivalent cushion or pad 52 to seal the vagina around the device. This cushion is carried by a hard rubber ring 53 having a flange adapted to engage over the periphery of the plate 48.

The plate 48 is provided with three countersunk holes 54 which may be formed by punching out circular discs of metal from the plate and plunging outwardly the metal around these holes. Thus, three frusto-conical seats are provided, and upon these seats sit three balls 55 fixed upon the shanks 21 of the dilating fingers 22, the shanks 22 passing diametrically through the balls. A disc 56, provided with holes and ball seats similar to those in the plate 48 but of opposite form, is disposed between the plate 48 and the valve housing 27, and between this disc 56 and the plate 48 is arranged a packing disc 57 formed of rubber or other suitable resilient packing material which is compressed between these two plates so as to expand it and cause the packing to make a fluid tight joint around each of the balls 55, the packing disc having suitable holes in which the balls of the three dilating fingers are situated. This packing disc 57 and the plates 48 and 56 thus form a diaphragm or partition which completely segregates the interior of the casing 2 from the fluid discharged from the vagina and through the pipe 50, so that this fluid does not at any time contact the dilating finger operating mechanism arranged within the casing 2.

The holes 54 in the plates 48 are each provided with lateral slots 54a to enable the plate to be slidden, during assembly, over the looped end of the dilating fingers.

The operation of the irrigation device is as follows:

Assuming the dilating fingers are in the retracted or inoperative position shown in Figure 1 the spray tube is inserted into the vagina until the cushion 52 seals the outer end of the latter. Irrigating fluid is then fed to the spigot 39 (which has previously been coupled to a flexible supply pipe) and the control wheel 9 is rotated so as to cause the nut or spider 13 to withdraw the valve 31 from its seat 29, so permitting the fluid entering the spigot 39 to flow through the valve housing 27 into and along the spray tube 23 and the nozzle 24 from whence the liquid passes into the vagina through the perforations in this tube and nozzle. Rotating the control wheel 9 to open the valve 31 simultaneously causes the pivots 18 and the links 19 to be moved relatively to the casing 2, and thus causes the outer ends of the shanks 21 of the dilating fingers to be drawn upwards towards the axis of the casing 2. This causes the dilating fingers 22 to rock upon their ball joints, and to make a dilating movement for dilating the vagina. The shanks of the dilating fingers are constrained to move in a purely radial direction by the walls of the slots 45 in the guide plate 44 within the casing 2.

On the completion of the irrigating operation the control wheel 9 is rotated in the opposite direction to that in which it was turned in the first place so as to retract the dilating fingers, and to close the valve 31 upon its seat 29 and stop the ingress of irrigating fluid.

The irrigating fluid, with the educted matter, is discharged from the device via the discharge pipe 50 and at no time enters the interior of the casing 2.

The apparatus may be washed thoroughly after use without danger of the dilating finger-operating mechanism being wetted or soiled as the case is sealed in a liquid-tight manner at all the joints so that liquid cannot enter it.

The rigid parts of the apparatus may be formed of metal, a moulded plastic (e. g., thermo-setting synthetic resin) or of any other suitable material or combination of materials.

I claim:

1. An irrigator of the kind specified comprising a tubular casing having a transverse plate across one end thereof, a closure extending across the other end of the casing, a sheet of resilient packing material upon said plate, an inverted pear-shaped plate upon said packing sheet, means adapted to draw the inverted pear-shaped plate towards the first-named plate to compress the packing material in the direction of the axis of the said casing and to expand it in a direction transverse to such axis, a valve housing within said casing, an axial tubular spigot on said valve housing projecting through a hole in the partition formed by said plates and the packing material sandwiched therebetween, a spray tube carried by the said tubular spigot, a further tubular spigot extending radially from said valve housing within said casing, an external tubular spigot coupled to said further tubular spigot and adapted to serve as the liquid inlet for the irrigator, an inlet fluid control valve within said housing, a valve seat in the housing cooperating with said valve and relative to which the valve is movable, a plurality of dilating fingers arranged around said spray tube and each having a shank portion provided with a bearing part rockably seated in a bearing formed in the plates composing the said partition, such pivots being sealed against the passage of liquid by the packing material of said partition, said shanks extending into the interior of said casing, screw and nut mechanism for operating said dilating fingers and said inlet control valve simultaneously, a control member outside said casing and associated with said screw and nut mechanism for actuating the same, sealing means for sealing all joints of the said casing against the ingress of liquid to the casing, a discharge tube extending from the spray tube side of said inverted pear-shaped plate adjacent the apex of the latter and outside the said casing and a resilient marginal cushion around the last-named plate adjacent the periphery and on the spray tube side thereof.

2. An irrigator according to claim 1, wherein the screw and nut mechanism comprises a screw threaded spindle to which the said control member is fixed, said spindle being rotatable in said casing but axially immovable therein, a nut mounted on said spindle and movable axially relatively to said casing, means for constraining said nut against rotation relatively to the casing, pivoted links coupling the shanks of said dilating fingers to the said nut and means for coupling said inlet liquid control valve to said nut.

3. An irrigator according to claim 1, wherein each of the plates of said partition have, for each dilating finger, a hole for the passage of the shank thereof, said hole being countersunk on the internal opposed surfaces of each of said plates to constitute an annular bearing for a ball pivot, and a ball pivot mounted in each of said seatings and having the shank of a dilating finger passing diametrically therethrough and fixed therein, said seatings being sealed against the passage of liquid into the interior of the casing by the resilient packing material between the said plates of the partition.

4. An irrigator of the kind specified comprising a tubular casing having a transverse partition extending across one end thereof, a closure extending across the other end of said casing, said partition and closure defining a sealed space within said casing, a spray tube extending forwardly from the partition end of said casing, a fluid inlet conduit passing into and through the sealed space within said casing and through said partition, and said inlet conduit communicating with said spray tube, a valve housing within said conduit, said housing containing a valve seat and a liquid inlet control valve for cooperation with said seat, a fluid discharge conduit outside said casing and communicating with the spray tube end of the irrigator to conduct away irrigating liquid and educted matter, a plurality of dilating fingers arranged around said spray tube and having shank portions passing through said partition into the interior of said casing and pivoted in said partition, said partition comprising a pair of rigid plates with resilient packing material interposed and compressed between them and forming a fluid-tight seal for the said finger shank portions at the parts where they pass through the said partition, screw and nut mechanism within said casing for oscillating said dilating fingers on their pivots, and a central member outside said casing and connected to said screw and nut mechanism for operating the latter.

5. A device of the kind specified for irrigating the cavities and passages of the body, such device comprising a tubular casing closed by a closure member at both ends to provide a sealed space within the casing, a spray tube extending from the closure member at one end of the casing, conduit means to lead irrigating fluid to said spray tube out of contact with the said sealed space, a plurality of dilating fingers arranged around the said spray tube and having shanks passing through the closure member from which the spray tube extends and into the said sealed space, a ball pivot on each of said shanks, a resilient seat for each ball pivot, such seats being provided in the closure member through which the said shanks pass and in which seats the said ball pivots are fluid-tightly sealed, operating mechanism within the said sealed space for actuating the said dilating fingers, a control member outside the said casing for actuating said operating mechanism, and a discharge conduit for the used irrigating fluid and educted matter, such discharge conduit being wholly segregated from the said sealed space.

6. A device according to claim 19, wherein means are provided for compressing the said resilient seats around the said ball pivots.

7. An irrigator of the kind specified comprising a closed tubular casing having a transverse rigid plate across one end thereof, a closure extending across the other end of said casing, a sheet of resilient packing material upon said plate, a further rigid plate on the outer side of said sheet of resilient material, means for drawing said rigid plates towards each other to compress the packing material between them and expand said material in a plane parallel to the planes of the said rigid plates, a spray tube extending through and outwardly from said rigid plates and sheet of packing material, conduit means to lead irrigating fluid to said spray tube out of contact with the interior of said tubular casing, valve means in said conduit means for controlling the supply of fluid to said spray tube, a plurality of dilating fingers arranged around said spray tube and each having a shank portion passing through said rigid plates and packing material into the interior of the casing, a ball pivot on each of said shanks, said ball pivot being supported in said rigid plates and resilient packing material and being sealed thereby against the passage of fluid into said casing, screw and nut mechanism for operating said dilating fingers and said valve means, a control member outside said casing for actuating said screw and nut mechanism, and a discharge conduit for the used irrigating fluid and educted matter, said discharge conduit being wholly segregated from the interior of said tubular casing.

ROLAND AUGUSTE VAN HASBROECK.

REFERENCES CITED

The following references are of record in the file of this patent:

UNITED STATES PATENTS

| Number | Name | Date |
|---|---|---|
| 1,034,818 | Mulgrew | Aug. 6, 1912 |
| 1,483,360 | McArthur | Feb. 12, 1924 |
| 1,943,110 | Corbett | Jan. 9, 1934 |

FOREIGN PATENTS

| Number | Country | Date |
|---|---|---|
| 20,704 | Great Britain | Oct. 12, 1905 |
| 364,791 | Italy | Nov. 15, 1938 |
| 472,364 | Great Britain | Sept. 22, 1937 |
| 815,861 | France | Apr. 19, 1937 |
| 849,437 | France | Aug. 11, 1939 |